United States Patent
Weiss et al.

(10) Patent No.: US 8,210,323 B2
(45) Date of Patent: Jul. 3, 2012

(54) MOTION CONTROL APPARATUS

(75) Inventors: Kevin B. Weiss, Stillwater, MN (US); Brad Briggs, Eagan, MN (US)

(73) Assignee: Nexen Group, Inc., Vadnais Heights, MN (US)

( * ) Notice: Subject to any disclaimer, the term of this patent is extended or adjusted under 35 U.S.C. 154(b) by 461 days.

(21) Appl. No.: 12/596,251

(22) PCT Filed: Apr. 16, 2008

(86) PCT No.: PCT/US2008/060492
§ 371 (c)(1),
(2), (4) Date: Oct. 16, 2009

(87) PCT Pub. No.: WO2008/131011
PCT Pub. Date: Oct. 30, 2008

(65) Prior Publication Data
US 2010/0089708 A1    Apr. 15, 2010

(51) Int. Cl.
*B65H 59/10*    (2006.01)
(52) U.S. Cl. ............................................. 188/67; 74/89
(58) Field of Classification Search .................. 188/67, 188/72.7, 74, 106 P, 106 R, 165; 74/89
See application file for complete search history.

(56) References Cited

U.S. PATENT DOCUMENTS

| | | | | |
|---|---|---|---|---|
| 5,486,056 A | * | 1/1996 | Thorn | 403/322.4 |
| 5,933,934 A | * | 8/1999 | Giannetti | 29/48.5 A |
| 6,460,678 B1 | | 10/2002 | Henk et al. | 192/143 |
| 7,124,861 B2 | | 10/2006 | Maher | 188/72.7 |

FOREIGN PATENT DOCUMENTS

| | | |
|---|---|---|
| DE | 42 22 727 A1 | 1/1994 |
| DE | 198 51 668 A1 | 5/2000 |
| DE | 201 14 440 U1 | 1/2002 |
| WO | WO 2006/047979 A | 5/2006 |

* cited by examiner

*Primary Examiner* — Christopher Schwartz
(74) *Attorney, Agent, or Firm* — Alan Kamrath; Kamrath IP Lawfirm, PA

(57) ABSTRACT

A motion control apparatus (10) in the form of a linear brake includes a camshaft (23) rotatable in a housing (11) moveable along a linear rail (30). The camshaft (23) is rotated by a gear motor (15) causing an eccentric engagement portion of a cam follower (24) to abut with a facing (12) which engages the linear rail (30) to provide a clamping force thereon. A damper (25) is received on a dowel pin (14) secured to the housing (11) and received in a U-shaped groove in the camshaft (23) to inhibit further rotation of the camshaft (23). A shim (20) separates the outer races of the bearings (22) receiving the camshaft (23) to preload the first and second bearings (22).

20 Claims, 5 Drawing Sheets

MOTION CONTROL APPARATUS

BACKGROUND

The present invention generally relates to motion control apparatus and in particular brakes. Specifically, the present invention relates to brakes suitable for use with a track to brake motion such as linear motion and, more specifically, relates to linear motion brakes utilizing low voltage direct current for actuation.

The popularity of linear motion devices in the machine tool, semiconductor, and medical industries has been increasing as the result of their ability to move a load in a linear movement direction to a position with extreme accuracy and at very high speeds. However, problems have been encountered in stopping or holding linear loads especially in the event of a power outage. Specifically, as movement and positioning of the load is dependent upon current being supplied to the linear motor, loads carried by linear motion devices will move under gravitational and/or inertia forces in the event that current is interrupted to the linear motor such as the result of a failure. This problem is also enhanced in linear motion devices because of the use of high performance linear bearings, which minimize sliding friction. Prior workers have devised a brake that cures the above deficiencies and that works with remarkable reliability and precision, see U.S. Pat. No. 6,460,678 to Henk et al., and U.S. Pat. No. 7,124,861 to Maher. The aforementioned art utilizes primarily fluid pressure for actuation. Many applications for linear devices do not have suitable sources of fluid pressure. However, electrical power, especially in low voltage, is readily available.

Mechatronics technology (the combination of mechanical engineering, electronic engineering and computing) is replacing traditional power methods that designers have relied upon for decades. In order to capture market share in this dynamic field, many companies are investing in products that perform the tasks of their pneumatic and hydraulic counterparts but with electrified power sources.

Thus, a need exists for a brake for stopping linearly moving loads and especially for use with linear motion devices and particularly for use in stopping linearly moving loads that includes electric actuation as a mode of operation.

Further, there is a need for electromechanical products that meet or exceed the performance characteristics of traditional pneumatic or hydraulic devices at marketable costs.

SUMMARY

The present invention solves these needs and other problems in the field of motion control by providing, a pin secured in the housing and received in a groove formed in the camshaft of a cam rotatably mounted in the housing. An eccentric cam follower of the cam abuts with a facing slideably mounted in the housing generally perpendicular to the rotation axis. The pin within the groove acts as a rotational stop to inhibit further rotation of the camshaft.

In a most preferred form, the camshaft has a cylindrical hole extending eccentrically to the rotation axis and which receives a stud of the cam follower. In most preferred aspects, the stud extends concentrically from a larger cylindrical engagement portion. Further, in most preferred aspects, the inner races of the first and second bearings are sandwiched between a pilot shoulder of the camshaft and the engagement portion of the cam follower.

In a most preferred form, a shim separates the outer races of the first and second bearings to preload the first and second bearings in an amount equal to axial displacement of the inner races of the first and second races under load.

In preferred aspects, the cam follower is locked from movement due to movement of the facing by abutting the pin with the end of the groove after the cam follower is rotated past when the facing abuts with the engagement location of the camming surface having a greater radial extent than a trailing portion having a decreasing radial extent.

The present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

Figure 1:
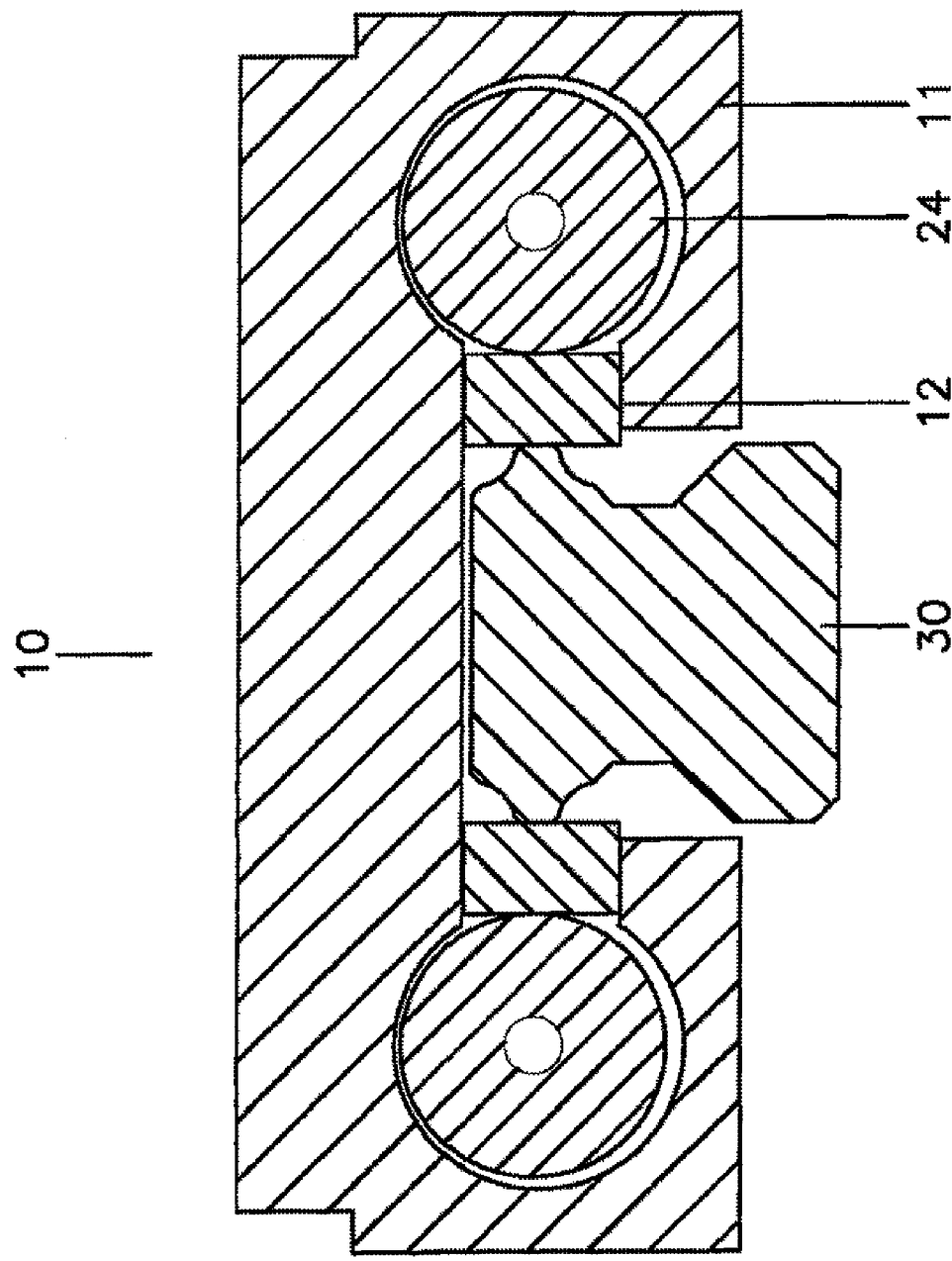
FIG. 1 shows a cross sectional view of a motion control apparatus according to the preferred teachings of the present invention.
Figure 2:
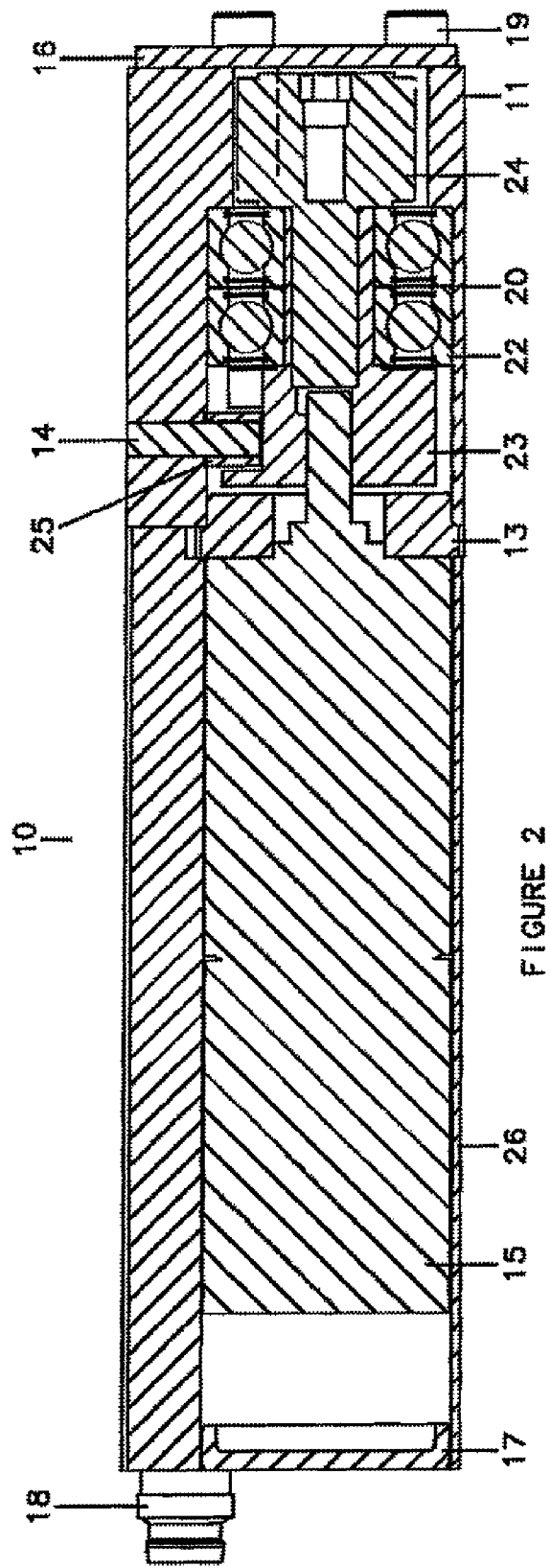
FIG. 2 shows a cross sectional view of the motion control apparatus of FIG. 1.

All figures are drawn for ease of explanation of the basic teachings of the present invention only; the extensions of the figures with respect to number, position, relationship, and dimensions of the parts to form the preferred embodiment will be explained or will be within the skill of the art after the following description has been read and understood. Further, the exact dimensions and dimensional proportions to conform to specific force, weight, strength, and similar requirements will likewise be within the skill of the art after the following description has been read and understood.

Where used in the various figures of the drawings, the same numerals designate the same or similar parts. Furthermore, when the terms "top", "bottom", "first", "second", "front", "back", "outer", "inner", "upper", "lower" "height", "width", "length", "size", "end", "side", "horizontal", "vertical", "axial", "radial", and similar terms are used herein, it should be understood that these terms have reference only to the structure shown in the drawings as it would appear to a person viewing the drawings and are utilized only to facilitate describing the illustrative embodiment.

DESCRIPTION

A motion control apparatus according to the preferred teachings of the present invention is shown in the drawings and generally designated 10. Generally, apparatus 10 in the most preferred form shown is a brake for stopping loads moving linearly along a linear rail 30. According to the preferred teachings of the present invention, apparatus 10 includes a housing 11 and a guard 26 which are suitably movable along the linear rail 30. Two pairs of first and second bearings 22 each have outer races press fit in the housing 11. First and second gear motors 15 are received in the guard 26 in spaced parallel chambers on opposite sides of and parallel to the linear rail 30. Each gear motor 15 includes a rotatable motor drive shaft. In the most preferred form, the drive shafts extend through annular holders 13, with the gear motors 15 being secured to the holders 13 by fasteners 29 and with the holders 13 separately secured at the first axial ends of the chambers to the guard 26 by fasteners 28. Suitable caps 17 can be utilized to close the second axial ends of the chambers of the guard 26.

Apparatus 10 according to the preferred teachings of the present invention including gear motors 15 uses bearings 22 and cam followers 24 to convert the rotational force of the gear motors 15 into linear force, therefore clamping the linear rail 30. For best results, the efficiency of converting the rotational torque to clamping force should be in the 85% range. This gives the design of the present invention more versatility for tuning, allowing for higher holding forces and/or faster engagement times.

Specifically, each gear motor 15 includes a DC motor coupled to a planetary gearbox to increase torque and reduce speed. The drive shaft of the gear motor 15 is then coupled to a camshaft 23 such as being received in a receiver counter bore extending from the first axial end of the camshaft 23 concentric to the rotation axis. The camshaft 23 is bearing supported in the housing 11 by the bearings 22 for rotation about a rotation axis parallel to and spaced from the linear rail 30. The camshaft 23 has an eccentric hole drilled down the rotation axis from its second axial end. This eccentric hole is tapped and has a counter bore to allow for installation of a stud of the cam follower 24. In this arrangement, the stud of the cam follower 24 is surrounded by semitubular portions of the camshaft 23 which is then concentrically surrounded by the first and second bearings 22. The cam follower 24 includes an engagement portion which interfaces with and abuts with a facing 12 slideably mounted in the housing 11 generally perpendicular to the rotation axis. The rotation of the camshaft 23 induced by the gear motor 15 causes the engagement portion of the cam follower 24 to follow an eccentric path about the rotation axis. This eccentricity urges the first and second bearings 22 in and out, much like that of a crankshaft, rod, and piston arrangement in an internal combustion engine. This system creates a great deal of force when the eccentric path reaches near tangent to the vertical surface of the facing 12.

Figure 3:
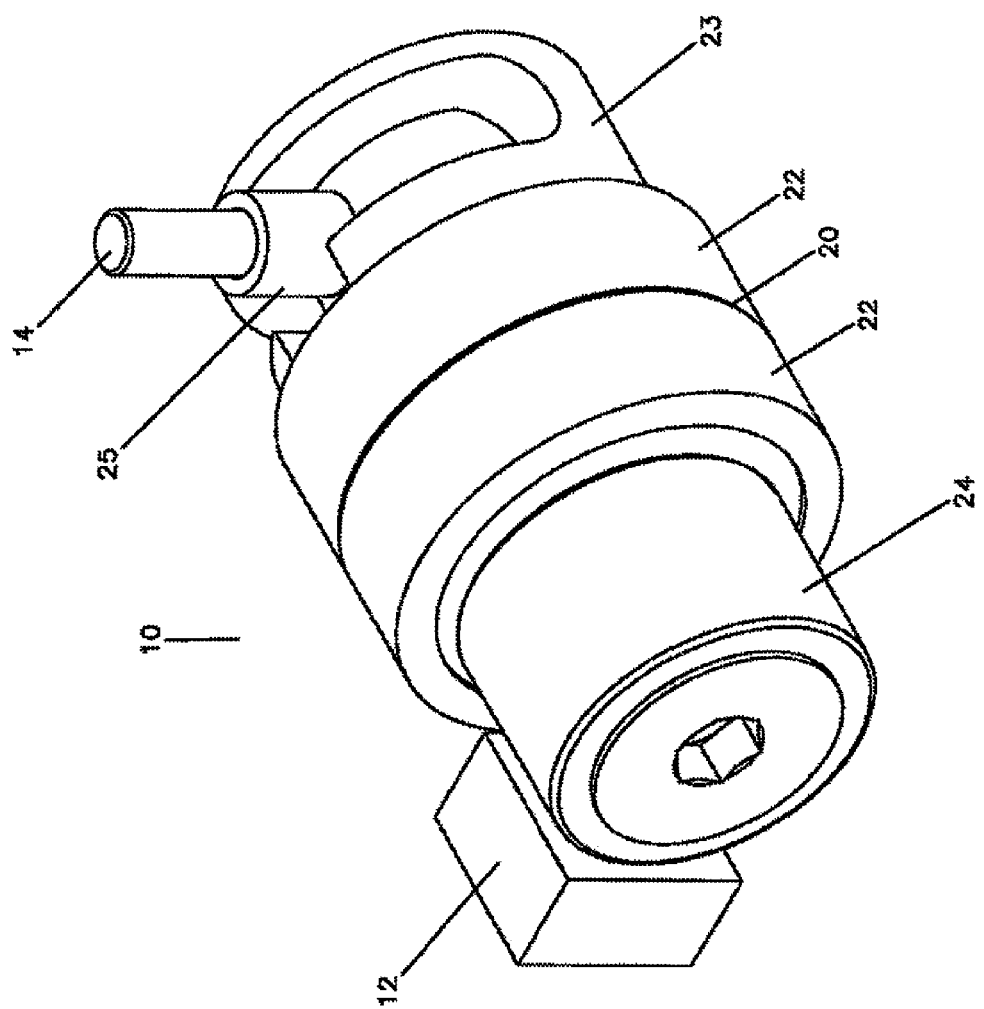
FIG. 3 shows a perspective view of a core assembly of the motion control apparatus of FIG. 1.

FIG. 3 shows the first and second bearings 22 and the cam follower 24 in place. A U-shaped groove has been machined into the camshaft 23 and extends in a plane perpendicular to the rotation axis. This U-shaped groove is designed to receive a dowel pin 14 and a urethane damper 25. To allow the placement of the damper 25 on the dowel pin 14 after being secured to such as by being pressed into the housing 11 and then to allow placement of the pin 14 and the damper 25 into the U-shaped groove, an axial channel interconnecting with the U-Shaped groove can be provided in the camshaft 23.

The combination of the pin 14 and the damper 25 acts as a rotational stop to inhibit further rotation of the camshaft 23. The full rotation of the camshaft 23 and the cam follower 24 is slightly over 180° around the rotation axis in the preferred form shown. The reason it is over 180° relates to the condition when power is removed from the apparatus 10. As the gear motor 15 rotates to its clamped position, power is removed. Power is limited due to the rated duty cycle of the gear motor 15 and due to the negative effects of heat generated from flowing current. It is most efficient to run the gear motor 15 at full current to generate high torque and let the over-center design of the U-shaped groove of the camshaft 23 hold the apparatus 10 in the engaged position. To illustrate, imagine the camshaft 23 rotating until the instantaneous slope of the eccentric curve of the cam follower 24 is tangent to the surface of the facing 12; that is, vertical. The stop is arranged such that the camshaft 23 will rotate slightly further "over-center" to lock the apparatus 10 on. Specifically, the cam follower 24 has an engagement location where the eccentric curve is tangent to the surface of the facing 12 and where the facing 12 is slid its maximum extent out of the housing 11. It should be realized that the camming surface includes a leading portion before the engagement location with the facing 12 abutting with the leading portion sliding further out of the housing 11 as the camshaft 23 is rotated towards the engagement location. As the camshaft 23 rotates beyond the engagement location, the facing 12 abutting with the leading portion is allowed to retreat from its maximum extent. The pin 14 and the damper 25 engage the end of the U-shaped groove shortly after the engagement location passes the facing 12. Thus, in the event that there is a loss of power to the gear motor 15, it is necessary for the facing 12 to be slid further out of the housing 11 before the facing 12 is allowed to slide into the housing 11. This is not likely to occur without the use of the gear motor 15. In the reverse direction, the stop has been set to fully open the apparatus 10.

The tubular urethane damper 25 used to encapsulate the dowel pin 14 acts as a rotational abutment. Running the apparatus 10 without this damper 25 or other dampening features can cause a number of gearbox failures of the gear motor 15 and severe wear to the torque transfer system between the motor drive shaft and the camshaft 23. Furthermore, the standard set screw and single flat on the motor drive shaft of the gearbox of the gear motor 15 were abandoned to an arrangement with two flats on the motor drive shaft and an oval shaped receiver counter bore in the camshaft 23 for receiving the motor drive shaft. The urethane damper 25 of the preferred form softens the torsional spikes that the rotating mass creates when an abrupt stop occurs. However, it should be appreciated that other forms of dampening provisions can be utilized according to the preferred teachings of the present invention.

According to the preferred teachings of the present invention, the camshaft 23 is separately formed and separable from the cam follower 24 and together define a cam. The stud is cylindrical shaped and extends from a cylindrical shaped engagement portion concentric to and larger than the stud. The camshaft 23 includes a pilot shoulder concentric to the rotation axis and for receiving the inner races of the first and second bearings 22. The inner races of the first and second bearings 22 are sandwiched between the pilot shoulder of the camshaft 23 and the engagement portion of the cam follower 24 when the stud of the cam follower 24 is threaded into the tapped eccentric hole of the camshaft 23. A fastening counter bore can be provided in the engagement portion of the cam follower 24 for assisting with relative rotation of the cam follower 24. Access to the fastening counter bore can be obtained by removing a cover 16 secured to the housing 11 by fasteners 19.

A shim 20 is added to the bearing assembly according to the teachings of the present invention. This shim 20 separates the outer races of the first and second bearings 22. By measuring and calculating the axial displacement of the inner races of the first and second bearings 22 under load, the shim 20 permanently induces this same amount of deflection into the drive assembly. By preloading, or more accurately, pre-displacing the bearing assembly, the deflection under full load is reduced to 0.001". This creates a stiffer, straighter clamping mechanism, which yields higher performance.

Figure 4:
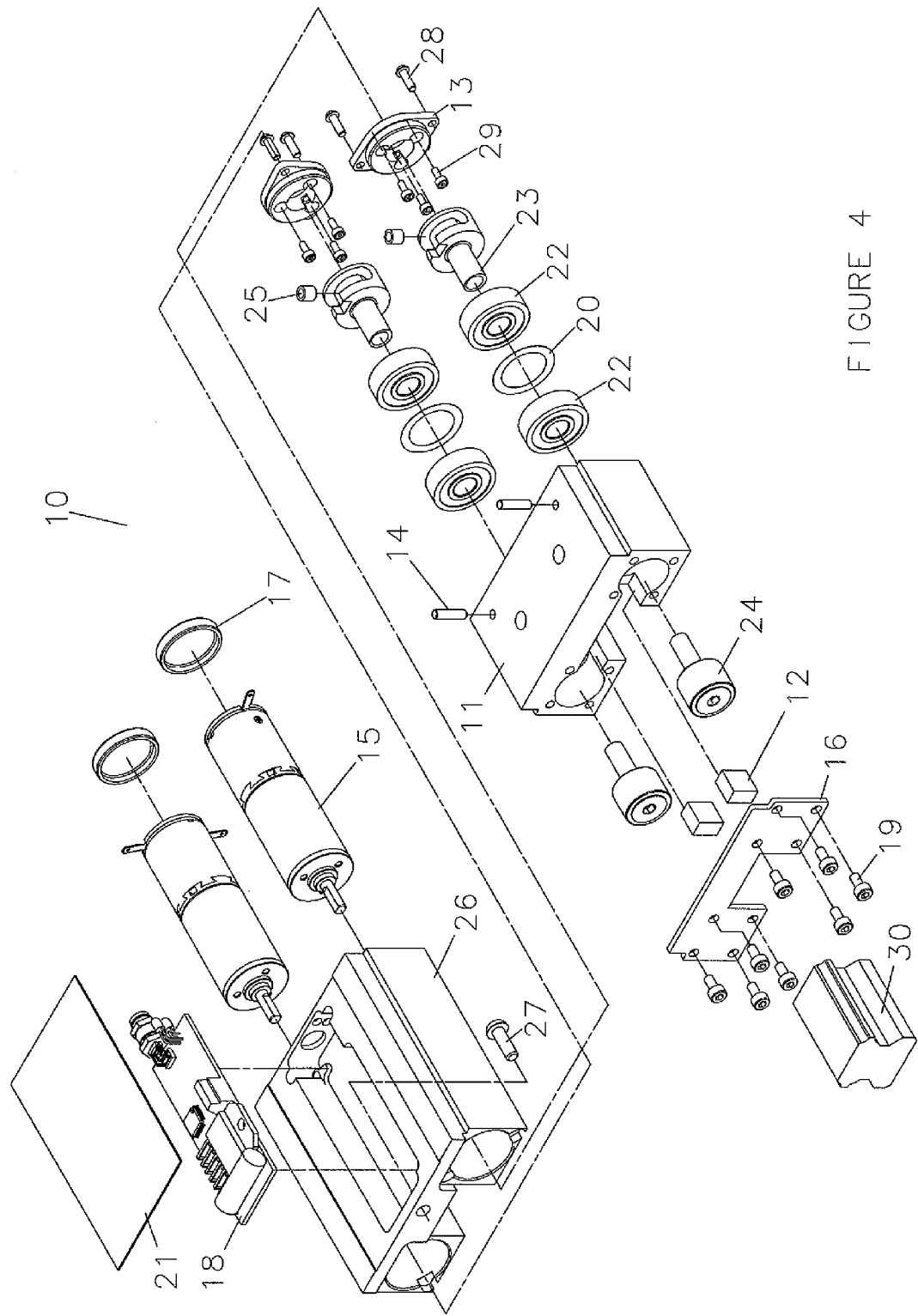
FIG. 4 shows an exploded perspective view of the eccentrically adjustable mount of FIG. 1.
Figure 5:
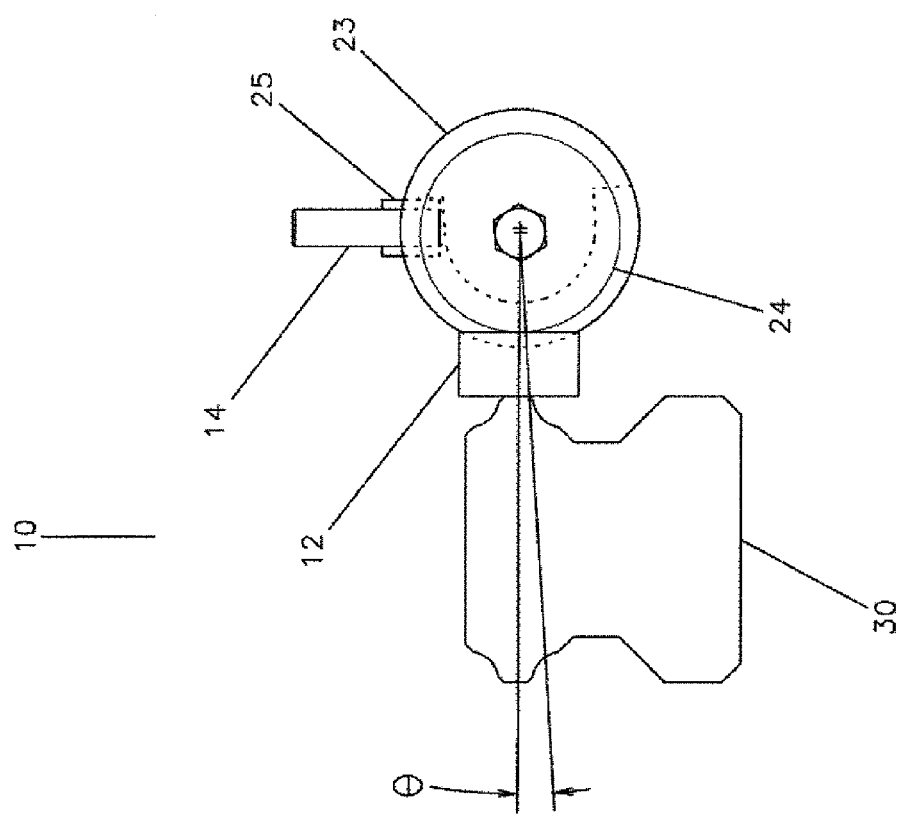
FIG. 5 shows a diagrammatic view of the cam follower and facing of the motion control apparatus of FIG. 1.

In the prior art, a controller is supplied as a separate item, usually to be mounted externally. Visible in FIG. 4, the motor controller 18 is encapsulated inside the guard 26. Specifically, in the preferred form, guard 26 includes a cavity intermediate the chambers receiving the gear motors 15 and above the linear rail 30. Guard 26 is secured to the housing 11 such as by fasteners 27 accessible in the cavity and extending through the guard 26 and secured in the housing 11. The annular holders 13 are sandwiched between the housing 11 and the guard 26. The cavity with the motor controller 18 therein can be closed by a cover 21.

A microcontroller and H-Bridge driver form the heart of the electronics of the motor controller 18. An engagement/disengagement signal is provided and received by the microcontroller. Next, the microcontroller sends the proper signals to the H-Bridge driver in order to operate the gear motors 15 and produce the desired engagement or disengagement of the apparatus 10 against the linear rail 30. If an engagement of the apparatus 10 is successful, the microcontroller will provide a digital indication of such via a signal light or logic high/low voltage signal. Additionally, the armature current of the gear motors 15 is monitored for possible engagement failure modes. These modes include but are not limited to: a missing linear rail 30, the motor armature circuit being an open circuit, the gear motors 15 continuously stalled (locked up), missing facings 12, and the gear motors 15 back driving. Once an engagement failure mode is detected, the digital indication is denied. This provides feedback to the user that the engagement is not confirmed. The armature current is conditioned by hardware and software in order to produce a stable signal upon which the microcontroller can make failure mode determinations.

In addition to failure mode detection, the armature current is used to determine when to slow the gear motors 15 down during engagement. When the current ramps up as the facings 12 contact the linear rail 30, the gear motors 15 are slowed down using a less than 100% duty cycle pulse width modulation signal from the H-Bridge driver. The slower speed is still sufficient to fully engage the apparatus 10 and allows for softer contact against the rotational stop, thus reducing stress on the mechanical components.

The motion control apparatus 10 according to the teachings of the present invention employs full rolling elements to convert rotational torque from an electrical power source into linear force. Furthermore, the arrangement of components of the motion control apparatus 10 of the present invention produces synergistic results offsetting the power density disadvantage in using electrical energy as its power source.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. Motion control apparatus comprising, in combination:
 a housing;
 a cam having a camshaft and a cam follower, with the camshaft being rotatably mounted in the housing about a rotation axis, with the cam follower following an eccentric path about the rotation axis;
 a facing slideably mounted in the housing generally perpendicular to the rotation axis, with the facing abutting with the cam follower;
 a groove formed in the camshaft extending perpendicular to the rotation axis and less than 360° around the rotation axis; and
 a pin secured in the housing and extending into the groove, with the pin and the groove acting as a rotational stop to inhibit further rotation of the camshaft about the rotation axis, with dampening being provided between the pin and the groove.

2. The motion control apparatus of claim 1 wherein the camshaft is separately formed and separable from the cam follower, with the camshaft having first and second axial ends, with the second axial end having a cylindrical hole extending eccentrically to the rotation axis, with the cam follower including a stud received in the cylindrical hole and an engagement portion engaging with the facing, with the stud extending from the engagement portion.

3. The motion control apparatus of claim 2 further comprising, in combination:
 first and second bearings each having outer races received in the housing and inner races receiving the camshaft, with the inner races of the first and second bearings being sandwiched between the camshaft and the cam follower; and
 a shim separating the outer races of the first and second bearings to preload the first and second bearings in an amount equal to axial displacement of the inner races under load.

4. The motion control apparatus of claim 3 wherein the engagement portion is cylindrical and is concentric to the stud.

5. The motion control apparatus of claim 1 further comprising, in combination:
 a motor having a drive shaft, with the first axial end including a counter bore extending concentrically to the rotation axis, with the drive shaft removably received in the counter bore.

6. The motion control apparatus of claim 5 further comprising, in combination:
 a guard secured to the housing, with the guard having a chamber, with the motor received in the chamber, with the guard further having a cavity; and
 a motor controller received in the cavity of the guard, with the motor controller controlling the motor.

7. The motion control apparatus of claim 6 further comprising, in combination:
 an annular holder sandwiched between the housing and the guard, with the drive shaft extending through the annular holder, with the annular holder secured to the motor, with the annular holder being separately secured to the guard and extending over the chamber.

8. The motion control apparatus of claim 1 with the cam follower having a camming surface defining the eccentric path, with the facing abutting with the camming surface, with the camming surface including at least one engagement location having a radial extent from the rotation axis with the camming surface including leading and trailing portions having a decreasing radial extent in the eccentric path before and after the at least one engagement location, with the facing slid out of the housing a maximum extent when abutting with the at least one engagement location, with the groove having first and second ends, with the pin abutting the first end of the groove when the facing abuts the trailing portion after the at least one engagement location to lock the facing from sliding.

9. The motion control apparatus of claim 1 further comprising, in combination:
 an annular dampener received on the pin and in the groove, with the annular dampener dampening shock between the pin and the groove.

10. The motion control apparatus of claim 1 further comprising, in combination:
 first and second bearings each having outer races received in the housing and inner races receiving the camshaft, wherein the camshaft is separately formed and separable from the cam follower, with the inner races of the first and second bearings being sandwiched between the camshaft and the cam follower; and a shim separating the outer races of the first and second bearings to preload the first and second bearings in an amount equal to axial displacement of the inner races under load.

11. The motion control apparatus of claim 1 further comprising, in combination:

a linear rail, with the housing being movable relative to the linear rail with the linear rail parallel to the rotation axis, with the facing engaging the linear rail.

12. The motion control apparatus of claim 1 wherein the groove extends in excess of 180° around the rotation axis.

13. Method of motion control comprising:

rotating a cam about a rotation axis, with the cam having a camming surface defining an eccentric path including at least one engagement location having a radial extent from the rotation axis and leading and trailing portions having a decreasing radial extent before and after the engagement location;

abutting a facing with the camming surface for movement perpendicular to the rotation axis; and abutting a pin with an end of a groove in the cam after the cam has been rotated about the rotation axis when the at least one engagement location passes the facing to lock the cam from rotating due to movement of the facing.

14. The method of claim 13 further comprising:

dampening the abutting of the pin with the end of the groove.

15. The method of claim 14 with dampening comprising providing an elastic annular dampener on the pin, with the dampener and the pin received in the groove.

16. The method of claim 15 wherein rotating the cam includes providing first and second bearings each having outer races received in a housing and inner races receiving a camshaft, wherein the camshaft is separately formed and separable a cam follower having the camming surface, with the inner races of the first and second bearings being sandwiched between the camshaft and the cam follower; and preloading the outer races of the first and second bearings in an amount equal to axial displacement of the inner races under load.

17. The method of claim 14 wherein rotating the cam includes providing first and second bearings each having outer races received in a housing and inner races receiving a camshaft, wherein the camshaft is separately formed and separable a cam follower having the camming surface, with the inner races of the first and second bearings being sandwiched between the camshaft and the cam follower; and preloading the outer races of the first and second bearings in an amount equal to axial displacement of the inner races under load.

18. The method of claim 13 wherein rotating the cam includes providing first and second bearings each having outer races received in a housing and inner races receiving a camshaft, wherein the camshaft is separately formed and separable from a cam follower having the camming surface, with the inner races of the first and second bearings being sandwiched between the camshaft and the cam follower; and preloading the outer races of the first and second bearings in an amount equal to axial displacement of the inner races under load.

19. The method of claim 18 wherein rotating comprises rotating the cam follower less than 360° and greater than 180°.

20. The method of claim 13 wherein rotating comprises rotating the cam follower less than 360° and greater than 180°.

* * * * *